(12) United States Patent
Sakamoto

(10) Patent No.: US 9,878,192 B2
(45) Date of Patent: Jan. 30, 2018

(54) DISPOSAL SYSTEM AND DISPOSAL APPARATUS

(71) Applicant: STREET DESIGN CORP., Yokohama-shi (JP)

(72) Inventor: Kajiro Sakamoto, Yokohama (JP)

(73) Assignee: STREET DESIGN CORP., Yokohama-shi (JP)

( * ) Notice: Subject to any disclaimer, the term of this patent is extended or adjusted under 35 U.S.C. 154(b) by 493 days.

(21) Appl. No.: 14/408,907

(22) PCT Filed: Oct. 15, 2013

(86) PCT No.: PCT/JP2013/078000
§ 371 (c)(1),
(2) Date: Dec. 17, 2014

(87) PCT Pub. No.: WO2014/069234
PCT Pub. Date: May 8, 2014

(65) Prior Publication Data
US 2015/0151153 A1    Jun. 4, 2015

(30) Foreign Application Priority Data
Nov. 2, 2012    (JP) ................... 2012-242754

(51) Int. Cl.
*A62D 3/40*    (2007.01)
*F23G 5/027*    (2006.01)
(Continued)

(52) U.S. Cl.
CPC .............. *A62D 3/40* (2013.01); *B09B 3/00* (2013.01); *B09B 3/0066* (2013.01);
(Continued)

(58) Field of Classification Search
CPC .......... F23G 5/027; F23G 5/0276; F23G 5/46; F23G 7/06; F23G 2201/303; F23G 2201/40; F23G 2900/50204; F23G 2900/7005
See application file for complete search history.

(56) References Cited

U.S. PATENT DOCUMENTS 2,579,398 A * 12/1951 Roetheli ................. C10B 49/22
                                                              201/20
2,662,816 A * 12/1953 Kalbach ................... C10J 3/482
                                                              48/202
(Continued)

FOREIGN PATENT DOCUMENTS

GB        2471462 A       1/2011
JP        H06-271307 A    9/1994
(Continued)

OTHER PUBLICATIONS

International Search Report and Written Opinion in corresponding PCT/JP2013/078000 dated Jan. 21, 2014.
(Continued)

*Primary Examiner* — David J Laux
(74) *Attorney, Agent, or Firm* — Marshall, Gerstein & Borun LLP

(57) ABSTRACT

A recycling disposal system is provided, the system efficiently combining the respective devices of a shredder, a carbonization furnace, and a gasification furnace to provide a new system combining low-temperature asbestos detoxification processing technology with biomass processing and recycling technology, and capable of energy-self-sufficient processing when operated in a disaster area.

12 Claims, 4 Drawing Sheets

(51) Int. Cl.
- *F23G 7/00* (2006.01)
- *F23G 5/033* (2006.01)
- *B09B 3/00* (2006.01)
- *C10J 3/62* (2006.01)
- *C10B 49/04* (2006.01)
- *C10B 53/00* (2006.01)
- *F27D 17/00* (2006.01)
- *C10J 3/10* (2006.01)
- *C10J 3/20* (2006.01)

(52) U.S. Cl.
CPC ............ *B09B 3/0083* (2013.01); *C10B 49/04* (2013.01); *C10B 53/00* (2013.01); *C10J 3/62* (2013.01); *F23G 5/0276* (2013.01); *F23G 5/033* (2013.01); *F23G 7/003* (2013.01); *C10J 3/10* (2013.01); *C10J 3/20* (2013.01); *C10J 2200/158* (2013.01); *C10J 2300/094* (2013.01); *C10J 2300/0946* (2013.01); *C10J 2300/0976* (2013.01); *C10J 2300/1246* (2013.01); *F23G 2205/121* (2013.01); *F23G 2900/7005* (2013.01); *F23G 2900/7008* (2013.01); *F27D 2017/005* (2013.01); *F27D 2017/006* (2013.01); *Y02E 20/12* (2013.01)

(56) References Cited

U.S. PATENT DOCUMENTS

| | | | | |
|---|---|---|---|---|
| 2,743,217 | A * | 4/1956 | Silsby | C10B 49/08 201/31 |
| 4,497,637 | A * | 2/1985 | Purdy | C10J 3/466 252/373 |
| 8,328,887 | B2 * | 12/2012 | Yang | C10J 3/466 423/650 |
| 8,431,044 | B2 * | 4/2013 | Zhang | C10J 3/66 252/373 |
| 2004/0045272 | A1 | 3/2004 | Miyoshi et al. | |
| 2012/0145051 | A1 | 6/2012 | Sweeney | |

FOREIGN PATENT DOCUMENTS

| | | |
|---|---|---|
| JP | 2007308871 A | 11/2007 |
| JP | 2008272535 A | 11/2008 |
| JP | 2010013583 A * | 1/2010 |

OTHER PUBLICATIONS

Extended European Search Report in EP Application No. 13852322.0 dated Jul. 13, 2016, 6 pages.

* cited by examiner

DISPOSAL SYSTEM AND DISPOSAL APPARATUS

CROSS-REFERENCE TO RELATED APPLICATIONS

This application is a U.S. National Phase application under 35 U.S.C. § 371 of International Application No. PCT/JP2013/078000 filed Oct. 15, 2013, entitled "Disposal System and Disposal Apparatus," which claims Convention priority from Japanese Patent Application No. 2012-242754 filed Nov. 2, 2012, the entire respective disclosures of which are incorporated herein by reference.

TECHNICAL FIELD

The present invention relates to a disposal system and disposal apparatus, and specifically relates to a disposal system and disposal apparatus for burnable wood-based, plastic-based, paper, and fiber-based waste. Even more specifically, the present invention relates to a self-sustaining-combustion type disposal system and disposal apparatus that performs detoxification even when waste contains, for example, asbestos.

BACKGROUND ART

The Great East Japan Earthquake and resultant tsunami struck tragically in March 2011.There is a need to dispose of a large quantity of debris (waste) that was generated as a result. This debris is composed mainly of wood-based materials from destroyed houses, driftwood and the like, various plastic-based materials, and paper- and fiber-based materials; the amount of this debris is enormous, frustrating disposal operations.

Extremely hazardous waste, including asbestos that would normally need to be disposed of as specially controlled industrial waste, is also contained therein. Under normal circumstances, this should be individually separated and disposed of appropriately, however this is impractical, further frustrating debris disposal.

The inventors have demonstrated that airborne asbestos such as spray-coating material, and asbestos coated plastic-based waste generated during removal operations thereof, can be fusion-detoxified in a comparatively low temperature region using an asbestos fusing agent, and plastic components can be converted into combustible gas for fuel by thermal decomposition (Japanese Patent Application Laid-Open (JP-A) No. 2007-308871).

SUMMARY OF INVENTION

Technical Problem

In consideration of the above circumstances, the present invention contributes to recovery operations and future disaster countermeasures by building on and improving the technology of JP-A No. 2007-308871 to construct a simple disposal system for waste even when asbestos-containing waste is included.

Moreover, the low temperature asbestos detoxification processing technology of JP-A No. 2007-308871 is combined with biomass processing and recycling technology to achieve a new system capable of energy-self-sufficient processing when operated in a disaster area. A contribution to disaster recovery operations can be made by installing the system at a debris processing site in a disaster area, or at a final disposal site.

Solution to Problem

A first of the present invention is a self-sustaining-combustion type processing and recycling system for recycling waste, and is configured by a shredder, a carbonization furnace, and a gasification furnace. The carbonization furnace is input with shredded material from the shredder, and this is combusted to obtain combustion exhaust gas and carbonized matter. Next, the carbonized matter is input to the gasification furnace, and water vapor is also input to the gasification furnace. Combustible generated gas is obtained by using the combustion exhaust gas to heat the carbonized matter and the water vapor in contact with each other. The obtained generated gas is employed in electricity generation, for example.

Note that when the waste contains asbestos, an asbestos fusing agent is incorporated inside the shredder. The asbestos fusing agent is preferably an alkaline compound (normally an alkali-based compound).

The obtained generated gas is what is referred to as water-gas, and is composed of a mixture of $H_2$, $CO$, $CO_2$.

The water-gas is combusted, and for example generally drives an electricity generator engine or a fuel cell to obtain electricity, of which a portion can be recycled for use in the respective processes of the system, or sold or used for other supply. Residual heat of the combustion exhaust gas can be employed for various heat sources.

A second of the present invention is a self-sustaining-combustion type processing waste recycling apparatus, and is configured by a shredder, a carbonization furnace, and a gasification furnace. Combustible waste such as wood-based, plastic-based, paper-based, or fiber-based waste is input to the shredder. The carbonization furnace has a tubular shaped structure, with an upper portion configuring a gas combustion section, a central portion and a lower portion respectively configuring a combustion section and a refining section, and a lowermost portion configuring a carbonized matter discharge section, and includes a shredded waste input port, air inlets to the respective combustion sections, a combustion exhaust gas discharge port, and an ignition burner. The gasification furnace has a double-layer tube structure, with the center configuring a reaction furnace for decomposing the carbonized matter, and the periphery configuring a reaction furnace heating section that heats the reaction furnace using the combustion exhaust gas, and includes an input port for the carbonized matter obtained in the carbonization furnace and a water vapor input port, and further includes a generated gas removal port and a slag discharge port. The combustion exhaust gas path includes an inlet and outlet for the combustion exhaust gas. This thereby enables utilization of the obtained generated gas, heat recycling of the gas from the combustion exhaust gas discharge port, and slag recycling.

The shredder may shred the mainly biomass-based, plastic-based, paper-based, and fiber-based input material to approximately 30 mm or below (in length), and in cases in which the waste contains asbestos, an asbestos fusing agent may be input to the shredded mixture.

A refining section of the carbonization furnace includes a heat storage plug projecting upright inside a tubular shape, has a structure in which carbonized matter drops down between an outside face of the heat storage plug and an inside face of a furnace casing, and performs carbonization using combustion heat alone.

Advantageous Effects of Invention

The present invention is a system combining a shredder, a carbonization furnace and a gasification furnace in sequence, and is capable of reliably processing asbestos-containing waste. The method of use enables a self-sufficient-fuel type combustion system employing biomass generated gas and plastic decomposition gas. Water-gas obtained in the processing can be reused as energy, the heat of combustion exhaust gas can be reused, and slag can be recycled. For example, the generated gases obtained can be used to drive an electricity generator, which can be used as the power source for the respective processes of the system.

With the present invention, even when asbestos is contained, this can be detoxified, and the overall volume of waste can be greatly reduced, dramatically facilitating waste disposal such as land reclamation, without hazardous materials remaining.

DESCRIPTION OF EMBODIMENTS

Disposal System and Apparatus Thereof

Figure 1:
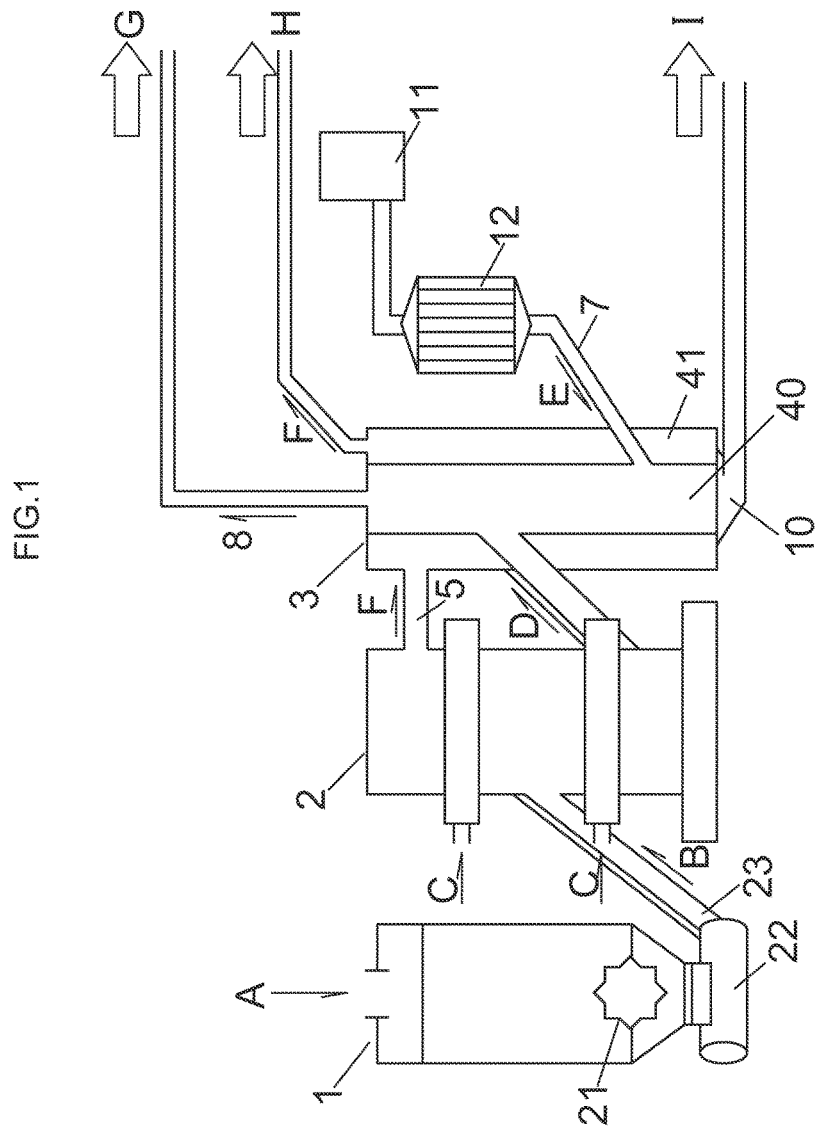
FIG. 1 is a drawing illustrating an overall system of the present invention.

FIG. 1 illustrates an overall system of the present invention. The drawing illustrates a shredder 1, a carbonization furnace 2, and a gasification furnace 3. Waste is input to the shredder 1 (arrow A) and the obtained shredded material input to the carbonization furnace 2 (arrow B), and air is introduced to the carbonization furnace 2 (arrow C) to obtain combustion exhaust gas 5 and carbonized matter. The carbonized matter is input to the gasification furnace 3 (arrow D), and water vapor 7 is input to the gasification furnace 3 (arrow E). With the carbonized matter and the water vapor in contact with each other, the combustion exhaust gas 5 is introduced to the gasification furnace 3 as a reaction heat source (arrow F), and gasification is performed mainly due to endothermic reactions. The drawing also illustrates a steam boiler 11 and a heat exchanger 12.

Obtained generated gas 8 is removed from the gasification furnace 3, and is employed in, for example, electricity generation, as described later (arrow G).

The combustion exhaust gas 5 is then discharged from the gasification furnace, moreover residual heat thereof is employed for various heat sources (arrow H), and recycling of slag 10 discharged from the gasification furnace 3 is achieved (arrow I).

Waste and Waste Shredder

FIG. 1 illustrates a shredding cutter 21 installed inside the waste shredder 1, a discharge screw 22, and a conveyance screw 23 installed at an incline and operated together with the discharge screw 22. The method of discharge and conveyance of mixed shredded material may be appropriately selected; however a screw method is preferable due to sealability considerations.

The shredded material is mainly unused biomass, such as wooden material from demolished buildings, forestry waste, unearthed roots, driftwood, dead trees, and other wood chippings, shredded into pieces of 30 mm or below. Since this is input mechanically, it goes without saying that various plastic waste, paper, fiber, and the like may also be input therewith in a similar manner. The present system performs carbonization using self-sustaining-combustion as a heat source, and the input chippings are carbonized and automatically discharged in around 20 to 25 minutes.

Presence of Asbestos

When this is performed, sometimes airborne and non-airborne asbestos would be present in the waste, however in the present invention, a fusing agent (for example an alkaline compound such as an alkali-based compound) is input together. Thus the asbestos is treated to volume reduction, solidification, and anti-scattering to render into a safe and stable form by fusion-detoxifying.

Carbonization Furnace

Figure 2:
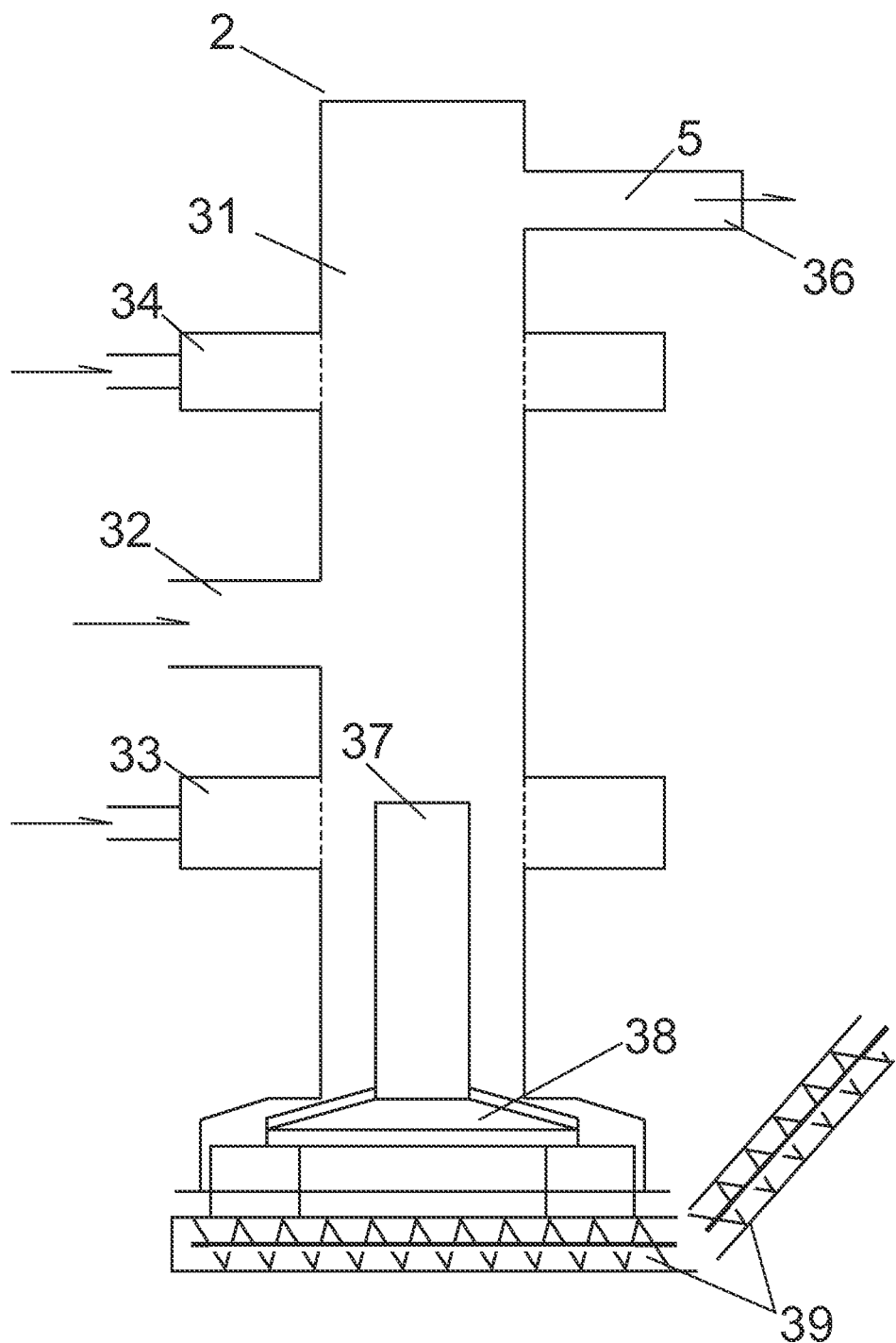
FIG. 2 is a drawing to explain a carbonization furnace.

FIG. 2 illustrates a basic structure of a self-sustaining-combustion (continuous flow type) carbonization furnace that is a feature of the present invention, namely of the carbonization furnace 2 that performs carbonization using the heat of its own combustion (heat of a partial oxidation reaction). The carbonization furnace 2 is covered by an appropriate fireproof insulation material, not illustrated in the drawings. The carbonization furnace 2 includes an internal circular cylinder portion 31. An upper portion of the circular cylinder interior portion 31 is a generated gas combustion section, a central portion is a shredding combustion section, and a lower portion is a refining section. The drawing also illustrates an entry port 32 for the mixed shredded material from the waste shredder 1, and air inlets 33, 34.

Namely, at the start of operation, the mixed shredded material introduced to the circular cylinder interior portion 31 of the carbonization furnace 2 is ignited by an ignition burner, not illustrated in the drawings, after which combustion is sustained by the air (oxygen) introduced through the air inlets 33, 34. In particular, the shredded material combusts using air from the air inlet 33, and generated gas rises and is completely combusted using air from the air inlet 34. Namely, combustible gas released from the shredded material is completely combusted in the combustion section to form combustion exhaust gas, which is conveyed through a pipe 36 to the following gasification furnace 3 as a heat source.

On the other hand, carbonized material drops down at an outside face of a cylindrical heat storage plug 37 and a side wall of the interior portion 31 of the carbonization furnace 2, and undergoes carbonization in anoxic conditions in the refining section at the lower portion of the carbonization furnace 2. A turntable 38, for example, provided at a bottom portion of the carbonization furnace 2 rotates to move the carbonized materials to a discharge portion to be discharged by a discharge screw 39. A screw method is preferable for input and discharge in the carbonization furnace 2 due to sealability considerations. The temperature inside the carbonization furnace 2 is approximately 950±50° C.

Gasification Furnace

Figure 3:
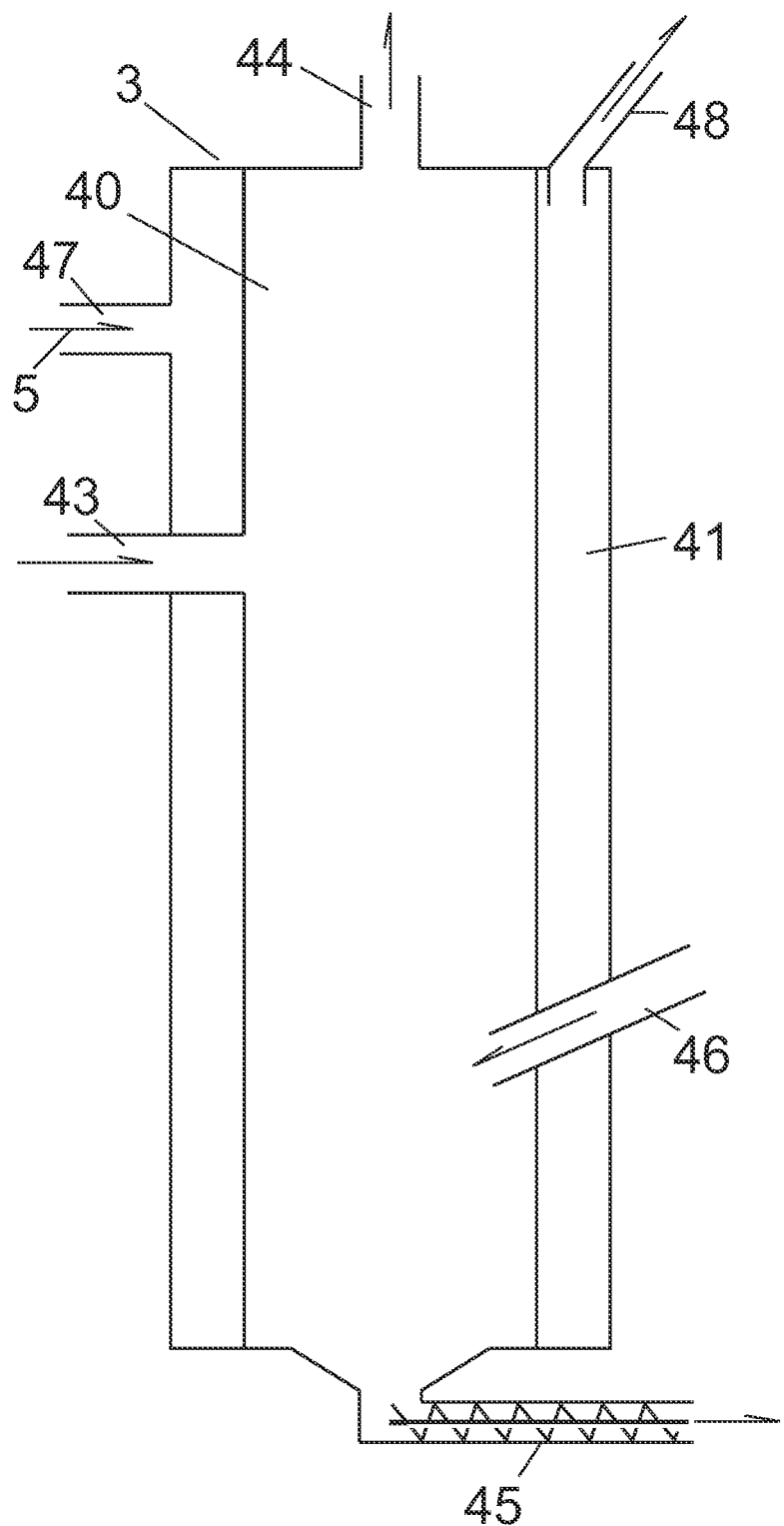
FIG. 3 is a drawing to explain a gasification furnace.

FIG. 3 illustrates the basic structure of the gasification furnace 3. Fireproof insulation material is omitted from illustration, similarly to in FIG. 2. A reaction furnace 40 of the circular cylinder shaped is disposed at the center gasification furnace 3, and a heat source chamber 41 (reaction furnace heating section) is disposed at the periphery of the reaction furnace 40. The reaction furnace 40 includes an entry port 43 to input the carbonized matter obtained by the carbonization furnace 2, a removal port 44 for gas generated by gasification, and a screw 45 for discharging the slag 10. A steam inlet 46 is also provided to introduce the steam that has to make contact with the input carbonized matter in order to generate gas.

The heat source chamber 41 includes a heat source inlet 47 that introduces the combustion exhaust gas (heat source) from the carbonization furnace 2, and is connected to the pipe 36. A heat source gas discharge port 48 is also provided to discharge the heat source gas employed in gasification.

In the gasification furnace 3, the carbonized matter obtained in the carbonization furnace 2 is input to the reaction furnace 40, and placed in contact with the steam similarly introduced to the reaction furnace 40, in response to which a gasification reaction occurs using the energy of the combustion exhaust gas as the reaction heat source. Thermal decomposition gasification is performed in the reaction furnace 40, generating what is referred to as water-gas ($H_2$, $CO$, $CO_2$), which is removed through the generated gas removal port 44 and, for example, employed in electricity generation or the like. The temperature of the gasification furnace 3 is around 850° C.

Combustible Fuel Gas (Water-gas)

In the present invention, water vapor serving as a gasification agent is introduced to the gasification furnace 3 and undergoes a contact reaction with the carbonized matter (carbon) to obtain a gas rich in hydrogen. To give examples of gasification reactions, $C+H_2O \rightarrow H_2+CO$ is obtained through an endothermic reaction, and $H_2O+CO \rightarrow H_2+CO_2$ is obtained through a shift reaction. In real-machine testing, water-gas of H2: 60%, CO: 20%, CO2: 20% was efficiently obtained.

Accordingly, in the present invention, no matter what the raw materials, provided that volatile content and heavy oil components have been driven off from the carbonized charcoal, good quality generated gas with no tar content can be obtained and employed in electricity generation, for example. The electricity thus obtained can be employed as it is as the electrical energy required for the respective processes of the present invention, enabling operation of a self-powered processing facility.

Note that considering the materials input as waste, some components of wood-based or plastic-based materials vaporize and contribute to combustion, and combustible fuel gases (water-gas) are obtained using this thermal energy, mainly employed as a gasification reaction heat source. The process of obtaining water-gas may be shown as biomass=>carbonized matter=>thermal decomposition gasification (heat source)=>water-gas, and preferably=>electricity generation=>electrical energy for each process.

On the other hand, the combustion exhaust gas from the carbonization furnace that is employed as a gasification heat source is removed through a discharge port 48, and the residual heat thereof goes on to be employed for various heat sources, and finally released into the atmosphere via a cooling device and a bag filter, for example.

Residue from the carbonized matter is removed as slag for recycling.

Modifying Asbestos

In order to detoxify asbestos a fusing agent needs to fuse asbestos at as low a temperature as possible, and alkaline compounds have attracted attention as such fusing agents. Asbestos may be rendered into a powder form, semi-baked form, or slurry form by heat processing at approximately 800° C. This thereby enables reliable decomposition of the asbestos, which is detoxified by, for example, causing destruction of the fibrous form, or breakdown of the crystalline structure of the asbestos. Calcium fluoride, calcium carbonate, calcium oxide, sodium silicate, sodium hydroxide or the like, or a combination thereof, may for example be employed as the fusing agent.

Other Examples of the Carbonization Furnace

The carbonization furnace illustrated in FIG. 2 may be modified according to its purpose. Namely, in the carbonization furnace illustrated in FIG. 2, the volume of carbonized matter obtained is comparatively large, however this is since combustion ash inappropriate for use as carbonized matter is all removed together with the carbonized matter. There is accordingly an issue of the volume of the gasification furnace 3 of the subsequent processes being larger than necessary.

Moreover, in cases in which there is a possibility of asbestos being mixed in with the waste, the asbestos is detoxified by adding the fusing agent to the waste, with this detoxified material also being removed together with the carbonized matter.

Figure 4:
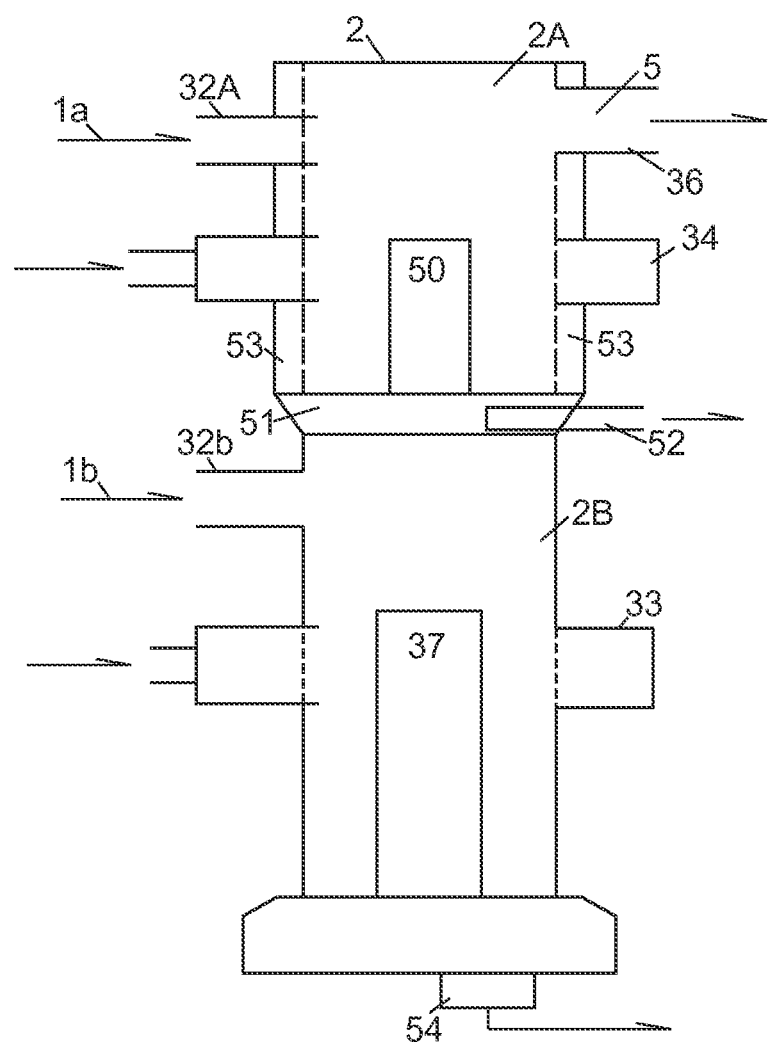
FIG. 4 is a drawing to explain another embodiment of a carbonization furnace.

In consideration of these points, as illustrated in FIG. 4, the carbonization furnace 2 may be configured divided into an upper furnace 2A (a combustion exhaust gas generation section) and a lower furnace 2B (carbonized matter generation section). Note that the carbonization furnace 2 may also be configured with a double-layer structure instead of the two-tiered structure of the upper furnace 2A and the lower furnace 2B. The input is sorted so as to input the upper furnace 2A with plastic-based waste (mixed shredded material) that generates mainly gas, and, if necessary, with asbestos-based waste and the fusing agent (upper carbonization furnace input waste 1a), and to input the lower furnace 2B with wood scraps, and paper and fiber-based waste (mixed shredded material) that is suited to forming the carbonized matter (lower carbonization furnace input waste 1b).

The carbonized matter obtained from the lower furnace 2B accordingly has a lower volume than the carbonized matter obtained from the carbonization furnace 2 illustrated in FIG. 2, and can be introduced into the gasification furnace 3 of the subsequent process as it is. Combustion residue that is not employed in the gasification furnace 3 is removed from the upper furnace 2A. Since this is removed separately to the carbonized matter, the carbonized matter removed from the lower furnace 2B has a volume lower than the carbonized matter obtained from the carbonization furnace 2 illustrated in FIG. 2 by an amount commensurate to the residue removed from the upper furnace 2A.

FIG. 4 illustrates a plastic/asbestos-based mixed shredded material entry port 32A and a wood scrap, paper-based, and fiber-based mixed shredded material entry port 32B. Note that obviously, a desired agitation device 50 may be provided inside the upper furnace 2A. The upper furnace 2A includes a bottom plate 51 and a combustion residue removal port 52. At the outside of the upper furnace 2A, a heat supply path 53 that supplies heat from the lower furnace 2B to the upper furnace 2A is formed extending upward from the bottom plate 51. Accordingly, heat generated by the partial combustion of the wood scrap, paper-based, and fiber-based mixed shredded material is conveyed inside the upper furnace 2A through the plate 51 and the heat supply path 53, aiding the thermal decomposition of the plastic-based and asbestos-based mixed shredded material in the upper furnace 2A. The lower furnace 2B includes a carbonized matter removal port 54. The carbonized matter removed through the carbonized matter removal port 54 is introduced to the gasification furnace 3 of the subsequent process.

In the carbonization furnace 2 of FIG. 4, a tar component is decomposed completely in the upper furnace 2A at temperatures of 1000° C. or above due to secondary combustion heat and the like, and asbestos-based waste is completely detoxified. On the other hand, the volume of the carbonized matter supplied to the gasification furnace 3 is smaller than the volume of the carbonized matter generated in the carbonization furnace 2 illustrated in FIG. 2, and so the circular cylinder shaped reaction furnace 40 of the gasification furnace 3 can be configured with a smaller diameter, and sufficient water-gas can be generated at reaction temperatures of approximately 750 to 850° C.

Modified Examples of Recycling Disposal Apparatus

Explanation has been given regarding a system and apparatus thereof of the present invention, for which the overall system should be integrally installed as a single disposal apparatus. However, it may be vehicle mounted, namely transportable equipment housed in a trailer, container, or the like, wherein the self-sustaining-combustion and self-powering features enable a contribution to be made to debris disposal and power supply facilities in disaster-hit areas and the like, both at home and abroad.

Moreover, possible embodiments of the present invention also include treating the overall system as separate devices, and setting up the devices in different locations and supplying materials as required, as well as installing the respective devices to separate vehicles for ease of transportation, and coupling together where required.

INDUSTRIAL APPLICABILITY

The present invention provides a self-sustaining-combustion type waste disposal system and disposal apparatus thereof, thereby enabling simpler processing of waste in which wood-based and plastic-based, or paper and fiber-based waste is mixed together, and enabling recycling of heat and gases obtained thereby.

The possible applications thereof are wide-ranging, and obviously include disposal of debris following unfortunate earthquake damage, as well as disposal in other locations, such as driftwood disposal after typhoons.

EXPLANATION OF THE REFERENCE NUMERALS

1 shredder
1a upper carbonization furnace input waste
1b lower carbonization furnace input waste
2 carbonization furnace
2A upper furnace
2B lower furnace
3 gasification furnace
7 water vapor
8 gasification
11 steam boiler
12 heat exchanger
21 shredding cutter
22 discharge screw
23 conveyance screw
30 fireproof insulation material
31 internal circular cylinder portion of gasification furnace
32 mixed shredded material entry port
32A plastic-based and asbestos-based mixed shredded material entry port
32B wood scrap, paper-based and fiber-based mixed shredded material entry port
33, 34 air inlet
35 ignition burner
36 heat source pipe
37 circular columnar shaped combustion plug
38 turntable
39 discharge screw
40 circular cylinder shaped reaction furnace
41 heat source chamber
43 waste entry port
44 generated gas removal port
45 slag discharge screw
46 steam inlet
47 heat source inlet
48 heat source gas discharge port
50 agitation device
51 bottom plate of upper furnace
52 combustion residue removal port
53 heat supply path
54 slag removal port
A waste input
B mixed shredded material input
C air introduction
D carbonized matter input
E water vapor input
F combustible gas introduction
G used in electricity generation, etc.
H use combustible gas
I slag recycling

The invention claimed is:

1. A disposal system comprising:
a shredder that shreds input material to produce shredded material;
a carbonization furnace that combusts the shredded material from the shredder to generate gas and carbonized material, the carbonization furnace completely combusting the gas to generate combustion exhaust gas and carbonizing the carbonized material in anoxic conditions to generate carbonized matter; and
a gasification furnace that places the carbonized matter generated in the carbonization furnace and water vapor in contact with each other while heating with the combustion exhaust gas generated in the carbonization furnace to react to generate combustible generated gas.

2. The disposal system of claim 1, wherein an asbestos fusing agent is incorporated into the shredded material and the shredded material is input to the carbonization furnace in cases in which asbestos is contained in the shredded material.

3. The disposal system of claim 1, wherein the generated gas obtained is a mixture including mainly $H_2$, CO, and $CO_2$.

4. The disposal system of claim 1, wherein at least a portion of the generated gas obtained is supplied to electricity generation.

5. The disposal system of claim 4, wherein at least a portion of the electricity obtained is recycled for use in respective processes of the system.

6. The disposal system of claim 1, wherein residual heat of the combustion exhaust gas is employed as various heat sources.

7. A disposal apparatus comprising:
a shredder that shreds input material to produce shredded material;
a carbonization furnace that combusts the shredded material to generate gas and carbonized material, the carbonization furnace completely combusting the gas to generate combustion exhaust gas and carbonizing the carbonized material in anoxic conditions to generate carbonized matter; and a gasification furnace that that reacts the carbonized matter generated in the carbonization furnace with water vapor while heating with the combustion exhaust gas generated in the carbonization furnace to generate combustible generated gas.

8. The disposal apparatus of claim 7, wherein:

the carbonization furnace includes:

a combustion section that combusts the shredded material input from the shredder, a gas combustion section that is positioned above the combustion section, and that combusts gas generated by combustion of the shredded material in the combustion section to produce the combustion exhaust gas, and a refining section that is positioned below the combustion section, and that further carbonizes the carbonized matter generated by combustion of the shredded material in the combustion section; and the gasification furnace includes:

a reaction furnace that is input with the carbonized matter generated in the carbonization furnace, and decomposes the carbonized matter in the presence of water vapor to produce generated gas, a steam inlet that introduces water vapor to the reaction furnace, a reaction furnace heating section that heats the reaction furnace by being introduced with the combustion exhaust gas generated in the carbonization furnace, and a generated gas removal port that removes the generated gas generated in the reaction furnace.

9. The disposal apparatus of claim 7, wherein the input material is shredded to approximately 30 mm (in length) in the shredder.

10. The disposal apparatus of claim 7, wherein an asbestos fusing agent is input to shredding in the shredder in cases in which asbestos is present in the input material.

11. The disposal apparatus of claim 7, wherein the refining section of the carbonization furnace includes a heat storage plug projecting upright inside a tubular shape, and has a structure in which the carbonized matter drops down between an outside face of the heat storage plug and an inside face of a furnace casing.

12. The disposal apparatus of claim 7, wherein the carbonization furnace includes:

a carbonized matter generation section that is input with at least one type of waste selected from wood-based, paper-based, or fiber-based waste to generate the carbonized matter; and a combustion exhaust gas generation section to generate the combustion exhaust gas, the combustion exhaust gas generation section being formed adjacent above the carbonized matter generation section such that heat generated in the carbonized matter generation section during carbonized matter generation is conveyed to the combustion exhaust gas generation section, and being input with at least one selected from plastic-based waste, asbestos-based waste, and a fusing agent.

\* \* \* \* \*

UNITED STATES PATENT AND TRADEMARK OFFICE
CERTIFICATE OF CORRECTION

PATENT NO. : 9,878,192 B2
APPLICATION NO. : 14/408907
DATED : January 30, 2018
INVENTOR(S) : Kajiro Sakamoto It is certified that error appears in the above-identified patent and that said Letters Patent is hereby corrected as shown below:

In the Claims

At Column 9, Line 5, "that that" should be -- that --.

Signed and Sealed this
Twenty-ninth Day of May, 2018

Andrei Iancu
*Director of the United States Patent and Trademark Office*